United States Patent
Lynn et al.

(10) Patent No.: US 10,077,177 B2
(45) Date of Patent: Sep. 18, 2018

(54) INTEGRATED TOUCH SCREEN DISPLAY WITH MULTI-MODE FUNCTIONALITY

(71) Applicants: Brian Christopher Lynn, Atlanta, GA (US); Nathaniel Wayne Rogers, Binghamton, NY (US); Gregory W Smiley, Greene, NY (US)

(72) Inventors: Brian Christopher Lynn, Atlanta, GA (US); Nathaniel Wayne Rogers, Binghamton, NY (US); Gregory W Smiley, Greene, NY (US)

(73) Assignee: The Raymond Corporation, Greene, NY (US)

( * ) Notice: Subject to any disclaimer, the term of this patent is extended or adjusted under 35 U.S.C. 154(b) by 217 days.

(21) Appl. No.: 14/575,408

(22) Filed: Dec. 18, 2014

(65) Prior Publication Data
US 2015/0175397 A1 Jun. 25, 2015

Related U.S. Application Data

(60) Provisional application No. 61/918,408, filed on Dec. 19, 2013.

(51) Int. Cl.
*B66F 9/075* (2006.01)
*B66F 9/24* (2006.01)
(Continued)

(52) U.S. Cl.
CPC .............. *B66F 9/0759* (2013.01); *B66F 9/24* (2013.01); *B66F 17/003* (2013.01); *G06F 3/0412* (2013.01); *G06F 3/04886* (2013.01)

(58) Field of Classification Search
CPC ........ B66F 9/0759; B66F 9/24; B66F 17/003; G06F 3/0412
(Continued)

(56) References Cited

U.S. PATENT DOCUMENTS 5,995,001 A * 11/1999 Wellman ............... B66F 17/003
340/438
6,039,141 A 3/2000 Denny
(Continued)

FOREIGN PATENT DOCUMENTS

DE 102011018802 A1 10/2012
EP 2338720 A1 6/2011
(Continued)

OTHER PUBLICATIONS

European Search Report; Appln. No. 14198740.4-1705; dated May 11, 2015; 6 pages.
(Continued)

*Primary Examiner* — Michael A Riegelman
(74) *Attorney, Agent, or Firm* — Quarles & Brady LLP

(57) ABSTRACT

Systems and methods include an integrated display having a graphical user interface that combines aspects of a telematic system with a vehicle control system. The integrated display combines a touch screen and a manual input keypad. Using both the touch screen's graphical user interface and the keypad, the integrated display can operate in multiple operation modes, including a touch mode where the operator controls the graphical user interface functions by touching predefined areas or tiles on the screen, and a keypad mode, where the operator controls the graphical user interface functions by touching keys on the manual input keypad. The integrated display can be controlled in a mixed mode operation, where the operator can control the graphical user interface functions using both the touch screen (touch mode) and the manual input keypad (keypad mode) to complete data entry processes, for example, and the integrated display can automatically transition between modes.

19 Claims, 11 Drawing Sheets

(51) Int. Cl.
  *B66F 17/00* (2006.01)
  *G06F 3/041* (2006.01)
  *G06F 3/0488* (2013.01)

(58) Field of Classification Search
  USPC ........................................................ 187/223
  See application file for complete search history.

(56) References Cited

U.S. PATENT DOCUMENTS

| | | | |
|---|---|---|---|
| 6,550,586 B1* | 4/2003 | Takeuchi | B66B 1/462 |
| | | | 187/391 |
| 6,724,403 B1 | 4/2004 | Santoro et al. | |
| D537,374 S * | 2/2007 | Smiley | D10/103 |
| 7,590,768 B2* | 9/2009 | Gormley | G05B 19/0421 |
| | | | 710/15 |
| 7,872,587 B2 | 1/2011 | Hindryckx et al. | |
| 2005/0283734 A1 | 12/2005 | Santoro et al. | |
| 2009/0059004 A1 | 3/2009 | Bochicchio | |
| 2011/0088979 A1* | 4/2011 | Bandringa | B66F 9/07518 |
| | | | 187/222 |
| 2011/0130865 A1* | 6/2011 | Setzer, Sr. | B66F 9/08 |
| | | | 700/213 |
| 2012/0235804 A1 | 9/2012 | Gilbride et al. | |
| 2013/0140092 A1 | 6/2013 | Warr | |
| 2013/0241720 A1 | 9/2013 | Ricci et al. | |
| 2014/0278621 A1* | 9/2014 | Medwin | G06Q 10/0631 |
| | | | 705/7.12 |

FOREIGN PATENT DOCUMENTS

| | | |
|---|---|---|
| GB | 2360500 A | 9/2001 |
| GB | 2460326 A | 12/2009 |
| WO | 2011033014 A1 | 3/2011 |
| WO | 2013074899 A1 | 5/2013 |

OTHER PUBLICATIONS

DE102011018802 English Abstract.
Yale, MR Reach series brochure; 16 pages; 2013.
Mastering ease of use with Topcon System 350, Topton Precision Ag; http://www.youtube.com/watch?v=far-XW8qKMY; published Oct. 19, 2012.
Topcon X30 and System 350, GeoShack; http://www.youtube.com/watch?v=mBa_Xk7HjU; published Nov. 17, 2011.
Topcon demonstrates iPad-like X30 console, PentonMediaAg; http://www.youtube.com/watch?v=jISTF8e6UTA; published Oct. 2, 2011.
IntelliView(TM) by New Holland; Published 2013, 36 pages.
https://en.wikipedia.org/wiki/Windows_Phone#User_interface; Feb. 27, 2017; 17 pages.
Fendt Variotronic, FendtTV; Aus Innovation wird Vorsprung, Die neue Fendt Variotronic; http://www.youtube.com/watch?v=EEYAnEzennA; published May 4, 2010.
Fendt touchscreen overview, Joel Wyttenbach; http://www.youtube.com/watch?v=idPm92i3cY0; published Feb. 3, 2013.
Fendt Teach In, Joel Wyttenbach; http://www.youtube.com/watch?v=b16uS4SnDEs; published May 10, 2013.

* cited by examiner

INTEGRATED TOUCH SCREEN DISPLAY WITH MULTI-MODE FUNCTIONALITY

CROSS-REFERENCE TO RELATED APPLICATIONS

This application claims the benefit of U.S. Provisional Patent Application Ser. No. 61/918,408, filed Dec. 19, 2013, and entitled "Integrated Touch Screen Display With Multi-Mode Functionality," which is hereby incorporated by reference.

STATEMENT CONCERNING FEDERALLY SPONSORED RESEARCH OR DEVELOPMENT

Not applicable.

FIELD OF THE INVENTION

The present invention relates to the field of material handling vehicles, and more specifically to a touch screen display and keypad that incorporates multiple modes of operation and that integrates a telematic system with a vehicle control system.

BACKGROUND OF THE INVENTION

Material handling vehicles are designed in a variety of configurations to perform a variety of tasks. These types of vehicles are commonly used in a warehouse or a factory to transport, store, and retrieve materials and finished goods.

In warehousing operations, material quantities and inventory turnover rates are increasing rapidly. Therefore, to maintain competitiveness, it is important for warehousing operations to ensure that each piece of equipment, and each employee is productive. Recent studies, in fact, have indicated that 70 percent to 80 percent of the cost of owning and operating a material handling vehicle is attributed to labor. For a warehouse to compete on the global level, continually improving operator productivity is vital to reducing costs. To meet these ends, warehouse management systems are frequently employed to, among other things, automatically measure and wirelessly transmit data to and from the material handling vehicle, and to monitor operator efficiency. In these warehouse management systems, a centralized computer system can be used to monitor inventory flow, maintenance status of fleets of industrial vehicles, operator performance parameters, and vehicle parameters.

To provide these telemetric functions, wiring harnesses and sensors are typically added to the vehicles in a fleet of material handling vehicles after manufacture. These wiring harnesses connect sensors and other devices into the system, and add a number of connection points within the vehicle. Because of the large number of connection points, these add-on systems can potentially fail.

It is desirable that the warehouse management system be able to review the efficiency of the vehicle fleet and determine when operational changes are required. Such changes include deploying the material handling vehicles to proper locations, acquiring additional material handling vehicles, and determining the different types of material handling vehicles needed.

It is further desirable to provide operator data and vehicle data to the truck operator in a manner that provides the most efficient use of the truck. In some arrangements, there can be multiple truck operator displays that display different types of data. One display can be provided that is integrated with the warehouse management system, as this can be an add-on system. Another display can be built into the vehicle that typically identifies vehicle related operational data, such as battery life and weight on the forks, for example. Not only do multiple displays make the vehicle operation less efficient for the vehicle operator, but the systems driving these displays are not well integrated, so the operator must understand the operation and functionality of more than one system and related display. What is needed is a display arrangement that solves the problems of prior vehicle display systems.

SUMMARY OF THE INVENTION

Embodiments of the present invention overcome the drawbacks of previous systems and methods by providing systems and methods that include an integrated display having a fully functional graphical user interface that combines aspects of a telematic system with a vehicle control system. The integrated display combines a fully touch screen and a manual input keypad. Using both the touch screen's graphical user interface and the keypad, the integrated display can operate in multiple modes of operation, including a touch mode where the operator controls the graphical user interface functions by touching predefined areas or tiles on the screen, and a keypad mode, where the operator controls the graphical user interface functions by touching keys on the manual input keypad. The integrated display can also be controlled in a mixed mode operation, where the operator can control the graphical user interface functions using both the touch screen (touch mode) and the manual input keypad (keypad mode) to complete a data entry process, for example, and the integrated display can automatically transition between modes.

In accordance with one embodiment of the invention, a material handling vehicle is disclosed. The material handling vehicle comprises a tractor unit; a vertically movable platform mounted relative to the tractor unit, the platform being vertically movable between an upper position and a lower position; and an integrated display system, the integrated display system including a display screen, the display screen to display at least one live tile.

In some embodiments, the at least one live tile displays live material handling vehicle data.

In some embodiments, the at least one live tile can be touched, and the display screen will display a menu associated with the at least one live tile and the live material handling vehicle data.

In some embodiments the display screen is a touch display screen operable by a user's touch.

In some embodiments, the touch display screen displays telematics information, warehouse management information, and vehicle information on one screen.

In some embodiments, a manual input keypad is included, with both the touch display screen and the manual input keypad operable to control the integrated display system.

In some embodiments, the integrated display system is operable in a mixed input mode, where in the mixed mode, the integrated display system automatically accepts input from the touch display screen immediately after input from the manual input keypad, and the integrated display system automatically accepts input from the manual input keypad immediately after input from the touch display screen.

In some embodiments, the appearance of a highlighted state on the touch display screen depends on toggling between input from the manual input keypad and input from the touch display screen.

In some embodiments, the at least one live tile displays a live battery status.

In some embodiments, when the at least one live tile is touched, the display screen will display a battery menu.

In some embodiments, the at least one live tile is user configurable.

In some embodiments, the display screen is customizable to display more than one live tile.

In accordance with another embodiment of the invention, an integrated display system is disclosed. The integrated display system comprises a display screen, the display screen to display telematics information, warehouse management information, and vehicle information on one screen.

In some embodiments, the one screen displays the telematics information, warehouse management information, and vehicle information arranged in a grid of live tiles.

In some embodiments, the integrated display displays a graphical user interface, the integrated display including a touch display screen, and a manual input keypad, with both the touch display screen and the manual input keypad operable to control the graphical user interface.

In some embodiments, the integrated display system is operable in a mixed input mode, where in the mixed mode, the integrated display system automatically accepts input from the touch display screen immediately after input from the manual input keypad, and the integrated display system automatically accepts input from the manual input keypad immediately after input from the touch display screen.

In some embodiments, the integrated display system is operably coupled to a material handling vehicle, the material handling vehicle including a tractor unit; and a vertically movable platform mounted relative to the tractor unit, the platform being vertically movable between an upper position and a lower position.

In some embodiments, a material handling vehicle operator to interact with the material handling vehicle uses the touch display screen only, the manual input keypad only, or a combination of both the touch display screen and the manual input keypad.

In some embodiments, the manual input keypad is a five way menu configuration with up, down, left, right and Enter functionality.

In some embodiments, the Enter functionality following a touch of the touch display screen enters a text string.

In some embodiments, the Enter functionality following a touch of an arrow key on the touch display screen enters a character.

In accordance with another embodiment of the invention, a material handling vehicle is disclosed. The material handling vehicle comprises a tractor unit; a vertically movable platform mounted relative to the tractor unit, the platform being vertically movable between an upper position and a lower position; an integrated display system, the integrated display system including a touch display screen, the touch display screen to display at least one live tile, the at least one live tile to display live material handling vehicle data; the touch display screen further displays at least one of telematics information, warehouse management information, and vehicle information on the touch display screen; a manual input keypad, with both the touch display screen and the manual input keypad operable to control the integrated display system; and wherein a material handling vehicle operator interacts with the material handling vehicle using the touch display screen only, the manual input keypad only, or a combination of both the touch display screen and the manual input keypad.

In some embodiments, the integrated display system displays a graphical user interface, with both the touch display screen and the manual input keypad operable to control the graphical user interface.

In some embodiments, the integrated display system is operable in a mixed input mode, where in the mixed mode, the integrated display system automatically accepts input from the touch display screen immediately after input from the manual input keypad, and the integrated display system automatically accepts input from the manual input keypad immediately after input from the touch display screen.

It is to be appreciated that the features described above can be combined in any number of various ways to describe systems or methods that incorporate features disclosed herein.

The foregoing and other objects and advantages of the invention will appear in the detailed description which follows. In the description, reference is made to the accompanying drawings which illustrate preferred embodiments.

Figure 1:
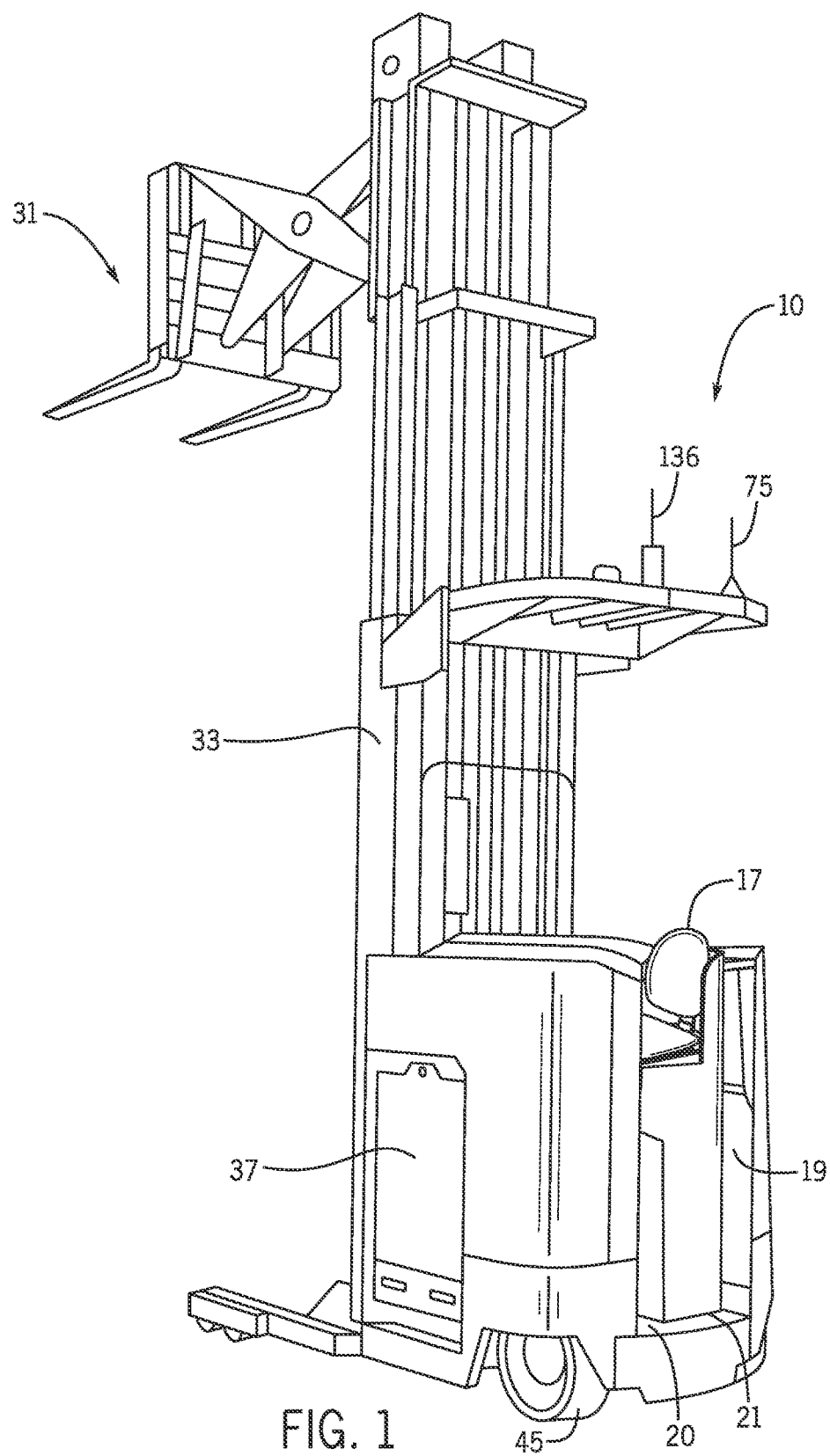
FIG. 1 is a perspective view of a material handling vehicle that has components operable with a warehouse communication system and a vehicle operator display system in accordance with embodiments of the present invention.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The invention will now be described more specifically with reference to the following embodiments. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "connected" and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, or components may be present in an actual embodiment.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

As used herein, the terms "processor" and "controller" may include one or more processors and memories and/or one or more programmable hardware elements. As used herein, the terms "processor" and "controller" are intended to include any types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which configuration data and programs may be stored and/or data communications may be buffered. The term "memory" may also include other types of known or future developed memory or combinations thereof.

The various aspects of the invention will be described in connection with an integrated display configuration on a material handling vehicle, the integrated display having multiple modes of operation. That is because the features and advantages that arise due to embodiments of the invention are well suited to this purpose. Still, it should be appreciated that the various aspects of the invention can be applied to other vehicles and to achieve other objectives as well.

Referring now to the Figures, and more particularly to FIG. 1, an embodiment of a material handling vehicle 10 that can incorporate an embodiment of the present invention is shown. FIG. 1 depicts a material handling vehicle 10, such as a lift truck, and includes an operator compartment 17 with an opening 19 for entry and exit of the operator. The operator compartment 17 can contain a control handle 14 (FIG. 2), an integrated display 55 (FIGS. 2 and 9), and a "deadman" switch 20 positioned on the floor 21. The "deadman" switch 20 must be closed by the operator's foot before any of the motors on the material handling vehicle can operate. A steering wheel 16 (FIG. 2) is also provided in the operator compartment 17. An antenna 75 for wireless communications with an external warehousing system can be coupled to the material handling vehicle and is, as described more fully below, connected to an internal vehicle controller 12 (FIG. 2) to provide bidirectional communications from the vehicle controller 12 to a warehousing system.

The material handling vehicle 10 is shown as a rider reach truck. It is to be appreciated that material handling vehicles are designed in a variety of configurations to perform a variety of tasks. Although the vehicle 10 is shown by way of example as a rider reach truck, it will be apparent to those of skill in the art that the embodiments are not limited to vehicles of this type, and can also be provided in various other types of vehicles, including for example, cars, vans, trucks, pallet trucks, stacker trucks, fore-aft stance operator lift trucks, hand/rider trucks, high-lift trucks, counterbalanced trucks, and swing-reach trucks, as non-limiting examples. The integrated display 55 is suitable for both driver controlled, pedestrian controlled and remotely controlled (AGV) material handling vehicles, and other powered vehicles used in a warehouse or a factory to transport, store, and retrieve items.

Figure 2:
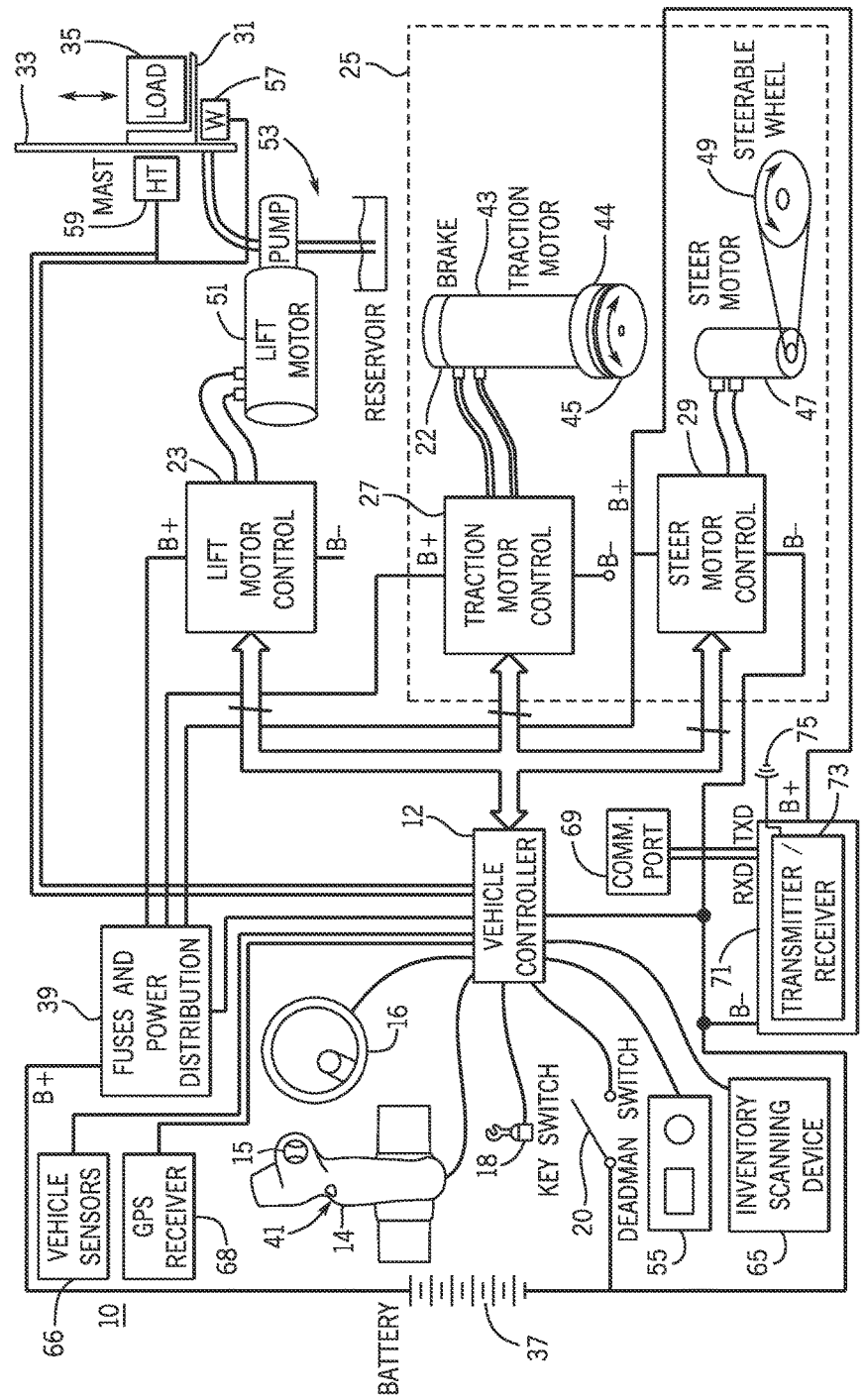
FIG. 2 is a block diagram of a control system of the material handling vehicle of FIG. 1, including an integrated display in accordance with embodiments of the present invention.

With reference to FIG. 2, the material handling vehicle comprises a vehicle controller 12 which receives operator input signals and, based on the received signals, provides command signals to each of a lift motor control 23 and a drive system 25 that includes both a traction motor control 27 and a steer motor control 29. The drive system 25 provides a motive force for driving the material handling vehicle in a selected direction, while the lift motor control 23 drives forks 31 along a mast 33 to raise or lower a load 35, as described below. The material handling vehicle and vehicle controller 12 can be powered by one or more battery(s) 37, coupled to the vehicle controller 12, drive system 25, steer motor control 29, and lift motor control 23 through a bank of fuses or circuit breakers 39.

The operator inputs include a key switch 18, "deadman" switch 20, steering wheel 16, an operator control handle 14, and the integrated display 55. The key switch 18 is activated to apply power to the vehicle controller 12, thereby enabling the material handling vehicle. The "deadman" switch 20 provides a signal to the vehicle controller 12 for operating the brake 22 to provide a "deadman" braking device, disabling motion of the vehicle unless the "deadman" switch 20 is activated by the operator. The "deadman" switch 20 also must be closed before the lift motor 51 or the steering motor 47 can operate.

The operator control handle 14 provides a travel request signal to the vehicle controller 12. Typically, the handle 14 is rotated in a vertical plane to provide a travel direction and speed command of motion for the material handling vehicle. A four-way switch 15 located on the top of the handle 14 provides a tilt up/down function when activated in the forward and reverse directions and a side shift right and left function when activated to the right and left directions. A plurality of control actuators 41 located on the handle 14 can provide additional functions, and can include, for example, a reach push button, a retract push button, and a horn push button as well as a potentiometer providing a lift function. A number of other functions could also be provided, depending on the construction and intended use of the material handling vehicle.

The traction motor control 27 drives one or more traction motor(s) 43 that is connected to wheel 45 to provide motive force to the lift truck. The speed and direction of the traction motor 43 and associated wheel are selected by the operator from the operator control handle 14. The vehicle speed and direction are typically monitored and controlled through speed and distance signals provided by a rotation sensor 44 which can be an encoder or other feedback device coupled to the traction motor 43, and those signals can provide feedback for determining a distance traveled by the material handling vehicle. The wheel 45 can also be connected to friction brake 22 through the traction motor 43, to provide both a service and parking brake function for the material handling vehicle. The friction brake 22 can be a spring-activated brake that defaults to a "brake on" position, such that the switch 20 and associated brake 22 therefore provide the "deadman" braking function. The operator must provide a signal indicating that the "deadman" brake is to be released to drive the truck, here provided by the "deadman" switch 20, as described above. The traction motor 43 is typically an electric motor, and the associated friction brakes 22 can be either electrically operated or hydraulically operated devices. Although one friction brake 22, traction motor 43, and wheel 45 are shown, the material handling vehicle can include one or more of these elements.

The steer motor control 29 is connected to drive a steering motor 47 and associated steerable wheel 49 in a direction selected by the operator by rotating the steering wheel 16, described above. The direction of rotation of the steerable wheel 49 determines the direction of motion of the material handling vehicle.

The lift motor control 23 provides command signals to control a lift motor 51 which is connected to a hydraulic circuit 53 for driving the forks 31 along the mast 33, thereby moving the load 35 up or down, depending on the direction selected at the control handle 14. In some applications, the mast 33 can be a telescoping mast. Here, additional hydraulic circuitry is provided to raise or lower the mast 33 as well as the forks 31. As shown here, a height sensor 59 is provided in the mast control system to provide a signal to the vehicle controller 12 indicating the height of the mast 33. The height sensor 59 can be, for example, an encoder, a flow sensor in the hydraulic system, a light beam, or other types of sensors. Similarly, a weight sensor 57 is provided on the forks 31. The weight sensor 57 can be, for example, a load cell, strain gauge, light beam or pressure sensor in the lift system and provides a signal to the controller 12 that indicates whether a load is on the forks, and a weight of the load.

In addition to providing control signals to the drive system and lift control system, the vehicle controller 12 can also furnish data to the integrated display 55 that provides information to the operator. Information presented on the integrated display 55 can include, for example, a weight of a pallet or load placed on the forks 31, the speed of the vehicle, the time, or maintenance information. Although not shown here, temperature sensors can also be included to monitor the temperature of the motors and other components. A wide variety of additional information can also be displayed, such as a number of pallets moved, a number of pallets moved over a period of time, an average number of pallets moved by the vehicle, as non-limiting examples.

The integrated display 55 can accept data input from the operator using both the touch screen 122 and the manual input keypad 124 (FIGS. 9 and 10), individually or in combination, as will be discussed in greater detail below. Data entry with the integrated display 55 allows the operator, a supervisor, or other personnel to enter data into the vehicle controller 12, and can be implemented with the touch screen 122, the manual input keypad 124, and in alternative embodiments, a keyboard, a series of input keys, a mouse, joystick and/or other input devices that could be integrated with the integrated display 55.

In addition to data input using the touch screen and manual input keypad, a number of additional data input and output devices can be connected to the vehicle controller 12, including, for example, an inventory scanning device 65, vehicle sensors 66 for parameters such as temperature, and a communications port 69. The inventory scanning device 65, can be, for example, a barcode reader, radio frequency identification (RFID) reader, data entry pad, RuBee™ or other IEEE P1902.1 standard reader or other device capable of reading corresponding identifiers such as RFID tags, IEEE P1902.1 tags, barcodes or other symbols associated with a pallet or other load.

The communications port 69 is connected to a warehouse communication interface 71 that can be mounted to the material handling vehicle and connected to the battery 37 of the vehicle electrical system. The warehouse communication interface 71 includes circuitry 73 and an antenna 75 for bidirectional, wireless communication with a communications system in the warehouse using any one of several well-known protocols.

Figure 3:
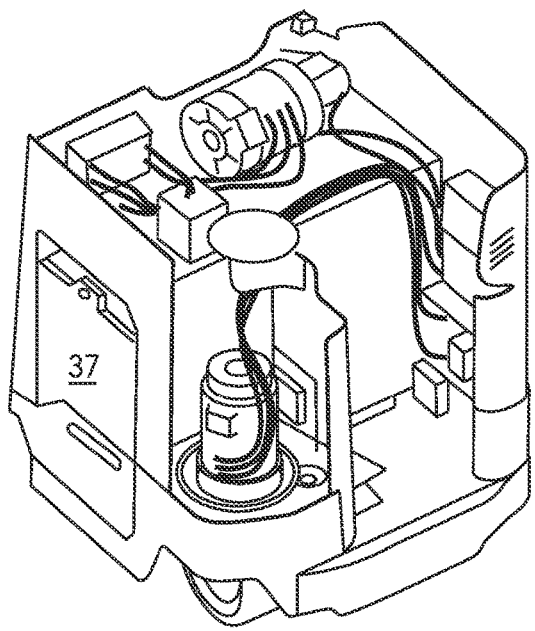
FIG. 3 is a partial rear view of the material handling vehicle with the housing removed to show an embodiment of a connection of a warehouse communication system to the vehicle.
Figure 4:
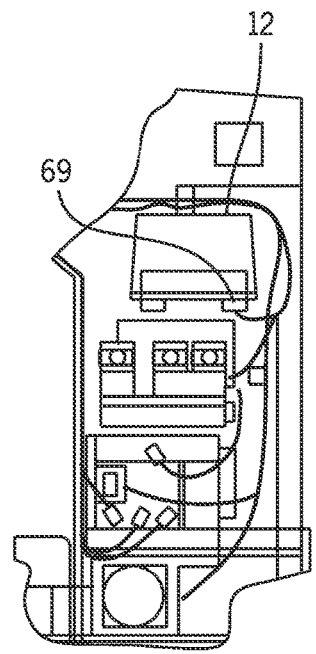
FIG. 4 is a partial view of the of FIG. 3 illustrating connections for coupling a device for the warehouse communication system to the wiring harness.
Figure 5:
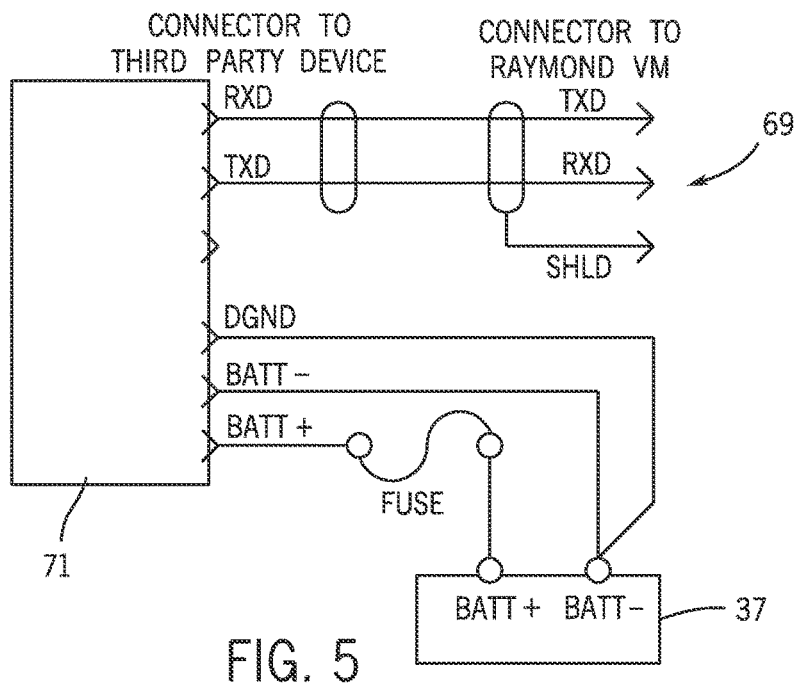
FIG. 5 is an exemplary circuit diagram of a wiring harness for connecting a wireless communications device to the control system in the material handling vehicle.

Referring now to FIGS. 3-5, the communication port 69 can be provided in the wiring harness of the truck 10 adjacent a housing for the vehicle controller 12. The communication interface 71 can include a mating connector that can be connected directly to the communications port 69. As shown here, additional connections can be made to a terminal strip to provide power connections to the battery 37. However, it will be apparent that battery power could also be routed directly through the communications port 69. The communication interface 71 can establish a bi-directional communications link through the communications port 69 with the vehicle controller 12. This link allows the transmission of sensor data, operational state data, and switch and control state data from the vehicle controller 12 to external devices. Additionally, because the communication interface 71 is connected directly to the vehicle controller 12, command signals from external apparatus can be applied to the vehicle, enabling signals to limit the speed of the vehicle, limit acceleration, provide data on the integrated display 55, and lock out the vehicle, as well as control other functions of the vehicle, for example.

Although a communications port 69 and associated communication interface 71 are shown here, it will be apparent that the communications to a warehouse management system could be transmitted directly to and from the vehicle controller 12. In some embodiments, however, a standardized RS-232 communications protocol can be used to provide communications into and out of the vehicle controller, thereby enabling the use of different communication interfaces 71 and warehousing computer systems with the vehicle 10. By providing simple connections and a standard protocol, systems and methods of the present technology are adaptable for use with a number of different warehousing systems.

Referring again to FIG. 2, the vehicle controller 12 can store data regarding the operation of the material handling vehicle. That data can include number of hours in operation, battery state of charge (BSOC), and fault codes encountered, for example. The hours of operation can be calculated as a function of the time that the "deadman" switch 20 is depressed, referred to as "deadman hours." Alternatively, the operating hours can be the time that the key switch 18 is closed, the lift motor 51 is active, or that the material handling vehicle 10 is traveling based on feedback from rotation sensor 44 connected to the traction motor 43. In addition, operation of the lift can be monitored using the time that the lift motor 51 is active. Various speed parameters such as speed and acceleration of the vehicle and of the mast 33 can also be monitored. The vehicle operational data can be collected and stored in a memory or other storage device within the vehicle controller 12.

The vehicle operational data can also include an operator identifier, such as a name or employee number, which can be entered through the integrated display 55 connected to the vehicle controller 12. Additionally, operator daily checklists can be presented to the operator on the integrated display 55. Data acquired from these checklists can be associated with the operator along with data related to that person's driving performance. For example, average vehicle acceleration rate and speed may be monitored, as well as collision data, number of pallets moved, or other data useful in monitoring operator performance, productivity, and efficiency. The operator can employ any of the input modes of the integrated display 55 to enter responses to the checklist items.

Figure 6:
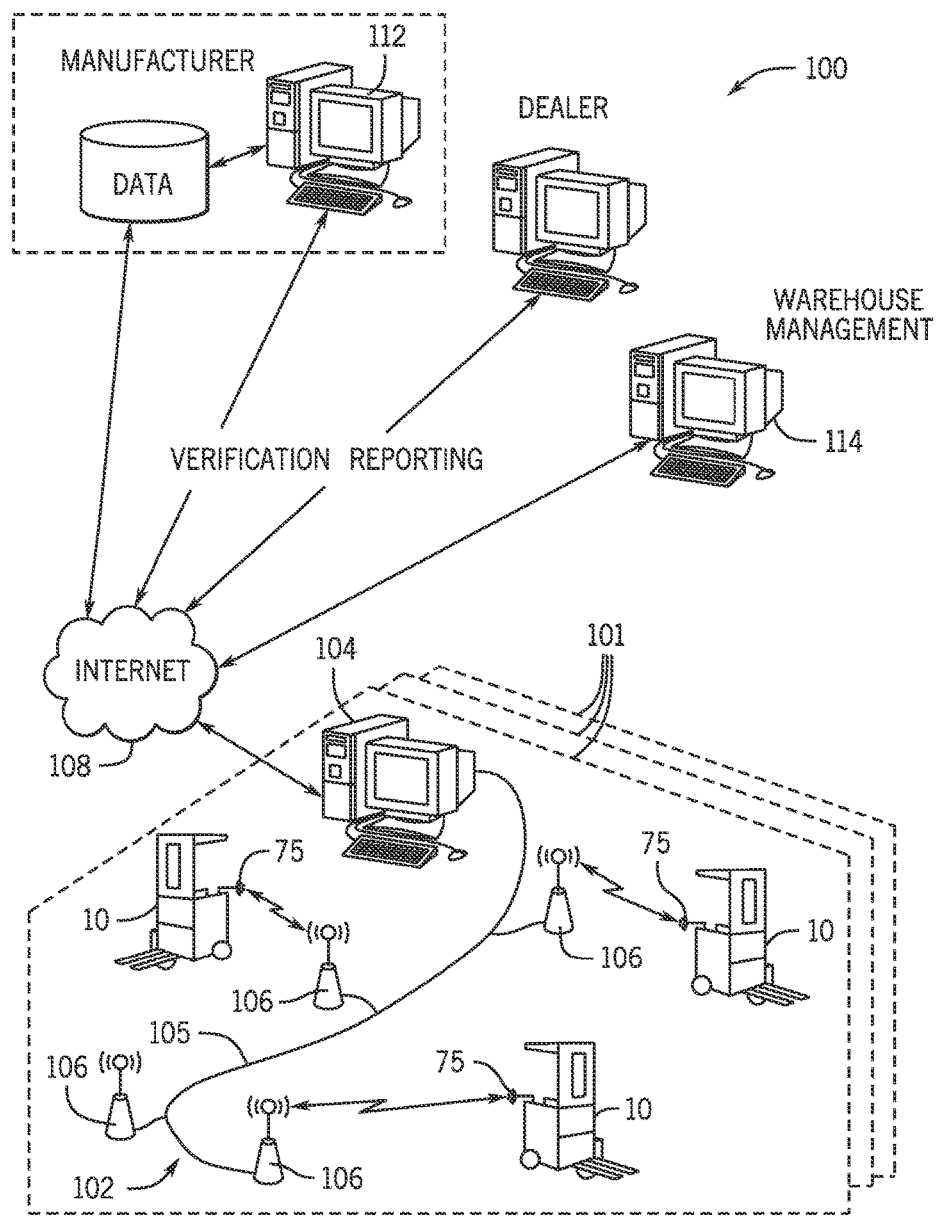
FIG. 6 is an illustration of an exemplary vehicle information system in which a material handling vehicle operating in a warehouse can exchange data with a warehouse computer system.

Referring now to FIG. 6, a vehicle information system 100 is provided for one or more warehouses 101, in which material handling vehicles 10 operate. The present invention is being described in the context of an exemplary company that has three facilities in the form of warehouses. Each warehouse 101 includes communications system 102 that links the vehicles therein to a centralized warehouse computer system 104. The communications system 102 has a plurality of wireless access points 106 distributed through a warehouse 101, such as in a shipping dock and in goods storage areas. The centralized warehouse computer system 104 communicates with the wireless access points 106 through a communications link 105, which is depicted as a hardwired local area network, however, the communications link may be implemented by a connection through the internet, a Wi-Fi system, or other wireless link.

Figure 7:
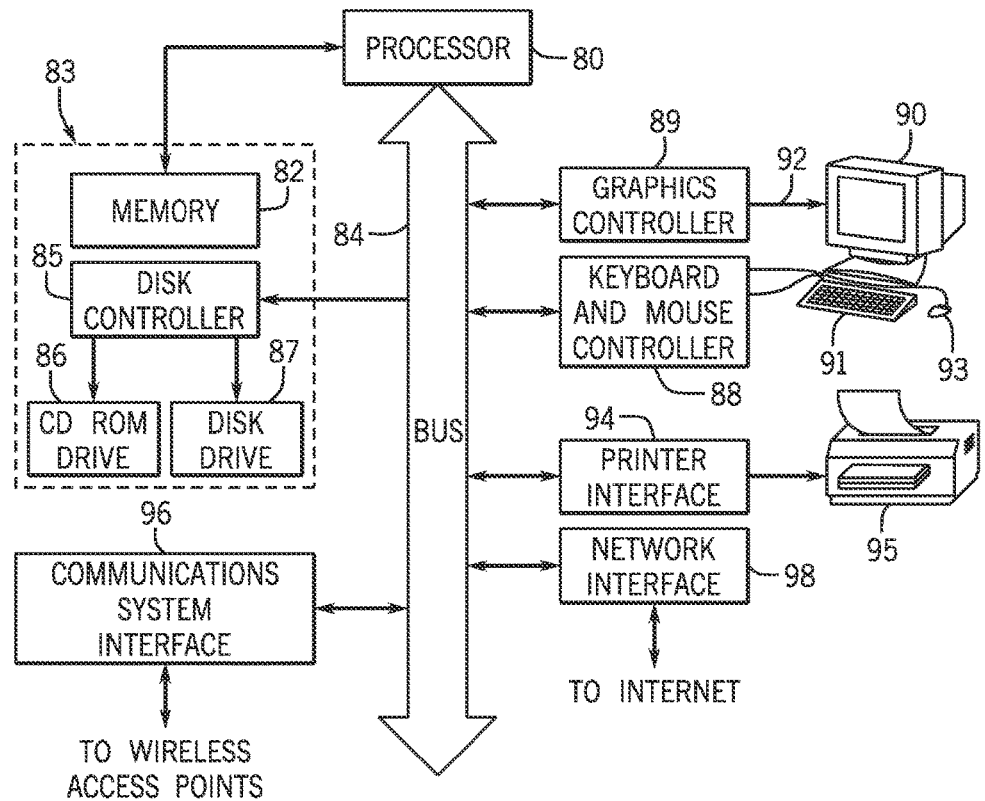
FIG. 7 is a block schematic diagram of warehouse computer system that can analyze the operational data gathered from the material handling vehicle.

With reference to FIG. 7, the warehouse computer system 104 includes a processor 80 that can execute program instructions stored in a memory 82 that forms part of a storage section 83. The processor 80 can be a commercially available device designed to operate with a commercially available operating system, for example. It can include internal memory and I/O control to facilitate system integration and integral memory management circuitry for handling all external memory 82. The processor 80 can also include a bus driver which provides a direct interface with a multi-bit bus 84.

The bus 84 can be an industry standard bus that transfers data between the processor 80 and a number of peripheral controller cards. These can include a disk controller 85 that provides a high-speed transfer of data to and from a CD ROM drive 86 and a disk drive 87, or other known storage devices. A graphics controller 89 can couple the bus 84 to a monitor 90 through a standard video connection 92, and a keyboard and mouse controller 88 receives data that is manually input through a keyboard 91 and mouse 93. The keyboard 91 and mouse 93 are each a "user input device" by which a human interfaces with a computer system. The warehouse computer system 104 can include a printer 95 coupled to the bus 84 by a printer interface 94 so that reports and monitor screen displays can be printed in hardcopy form. The graphics controller 89 and the monitor 90, along with the processor 80 when executing the appropriate software, are considered as forming a report generator. The bus 84 also connects to a communications system interface 96 that connects to the wireless access points 106, and a network interface 98 can be provided to couple the warehouse computer system 104 to a wide area network, such as the Internet.

Returning to FIG. 6, the warehouse management computer system 114 at the headquarters of the warehouse company can be similar to that described for the warehouse computer system 104 in so far as the present invention is concerned. Thus both warehouse computer system 104 and the headquarters computer system 114 can execute the same software for analyzing and reporting the operating information for the material handling vehicles.

The warehouse computer system 104 can be connected to a wide area network that can be an Internet link 108 as shown here or other types of wired or wireless networks. Through the Internet link 108, the warehouse computer system 104 can be connected to a database 110 which stores vehicle specific data provided by the manufacturer through a manufacturer computer system 112. Selected data can also be accessed by, for example, warehouse management personnel or vehicle dealers, who can connect to the database 110 through the Internet link 108.

Data stored in the database 110 pertaining to a specific vehicle can be accessed by using the vehicle serial number and that detailed data can include, for example, truck documentation and parts & service manuals; field service bulletins and other information; as built Bill of Materials (BOM); options added (truck modification history); as built performance information (QAP); service history (parts, labor, tech observations); operating history (impacts, hour meters, fault codes, age); use/maintenance history (hour meters, fault codes, BSOC); sale/resale history; end of service date; etc. A model number can be used to access general information pertaining to the type of material handling vehicle, such as parts & service manuals.

Referring to FIGS. 2 and 6, the communication interface 71 and antenna 75 can be employed to wirelessly transmit vehicle data including, for example, its serial number, an operator identifier, and vehicle operational data from the vehicle to the communications system 102. That information is received by the communications system 102 which conveys the serial number and operational data to the warehouse computer system 104. Those wireless transmissions can occur continuously while the vehicle is operating, at defined time intervals, or upon an occurrence of a given event such as the end of a work shift or a fault condition, for example. The information gathered from each vehicle 10, then can be relayed occasionally through the Internet link 108 to the database 110 and also may be sent to the computer system 114 at the headquarters of the warehouse company.

Because of the bidirectional communications between the vehicle controller 12 and the warehouse communications system, the warehouse communications system 102 can also control operating parameters of the material handling vehicle. In particular, the system can control the maximum speed and acceleration of the truck in both the forward and reverse travel directions. Other vehicle functions, such as the horn, can also be activated by the warehouse computer system 104, as an alarm when certain operating conditions are detected.

Thus, for example, the warehouse control system can correlate the work intensity of a vehicle to the level of wear experienced by key components. For example, if a temperature sensor indicates that the component temperatures are rising at a higher than expected rate, but the overall level of productivity is not excessive, it could be concluded that an operator is using the truck hard for a period and then sitting idle. To prevent overheating of the vehicle, the warehouse communications system can limit both the acceleration and maximum speed of the truck. The truck operation parameters, such as speed and acceleration, can also be limited to control energy consumption of the vehicle, and to promote "green" truck usage.

Similarly, if the battery state of charge is low near the end of a shift, the warehouse communications system can limit the acceleration and maximum speed of the vehicle to delay the need for recharging the battery. Based on inventory data, if the "fragility" of a load is known, the acceleration and speed of the vehicle can also be limited accordingly. On rental fleets, truck operational parameters could be limited when payment is not received in a timely manner.

Additionally, control of the vehicle can be used to provide "zoning" for the vehicles. Using location data based on input, for example from the wireless access points 106, a GPS receiver 68, a beacon mounted in a particular location, or other input, a virtual geographical area can be defined for vehicles in use, to assure that vehicles follow approved routes. If a designated boundary is crossed, a notification with a time, date and location stamp can be recorded by the warehousing control system. This data can be used to monitor operators. Alternatively, the warehouse computer system can turn off the vehicle, or limit the maximum speed or acceleration when a boundary line is crossed. The integrated display 55 in the vehicle can also be used to provide an indicator to the operator when approaching or exceeding a boundary. This system can be used to assist in preventing trucks that are too tall from going into an area with low ceiling or door heights, to keep unqualified material handling vehicles out of an area that requires EE rated battery powered vehicles (as defined in Underwriters Laboratory standard UL 583), or to keep unqualified material handling vehicles out of cold storage areas, as non-limiting examples.

Similarly, the acceleration and speed of the vehicle may be limited based on operator feedback. During a training period of an operator, the warehouse computer system 104 may limit the speed or other functions of the vehicle on which such an operator is logged on.

The warehouse computer system 104 can also provide a signal to lock the truck out of commission entirely. For example, when a truck requires service, the truck can be locked in the off position until activated by authorized service personnel.

Because of access to the integrated display 55 in the vehicle 10, the integrated display 55 can also be used by the warehousing system. For example, warehouse service bulletins can be transmitted to the integrated display 55. As described above, if service is required, the vehicle could also be locked in position, or the operation of the vehicle intentionally limited until service is performed. The vehicle controller 12 could then send out a signal indicating that a service bulletin has been completed. The vehicle controller 12 could also tracks how long maintenance took, and send that information when maintenance has been completed, thereby also providing a means for tracking the efficiency and effectiveness of service and maintenance operations.

Additionally, messages can be sent from the warehouse computer system 104 to the integrated display 55 to alert operators to conditions in the warehouse/factory, such as a spill in an aisle. This information could also be tied into alarms such as fire or chemical release alarms. The operator may have to perform an action, such as pressing an active tile on the touch screen 122 or an available button on the keypad 124 to acknowledge receipt of the message. Paging messages, news blurbs, and other information could also be written to the integrated display 55 in the vehicle from the warehouse communications system, or from another computer connected to the warehouse communications system.

Similarly, when a software update is required, the software update can be transmitted to the entire fleet of vehicles, or only those with a particular version of software, based on data in the database 110. Additionally, the warehouse computer system could be used to configure or reconfigure the software in a selected or a fleet of vehicles 10.

Other commands could be broadcast to the vehicles from the warehouse computer system 104. For example, a maintenance reminder could be set individually on vehicles in the fleet, or for all vehicles simultaneously. When maintenance is complete, the vehicle controller 12 can send a signal back to the warehouse computer system to reset the maintenance clock.

Additionally, dedicated actuators or buttons in the vehicle, or an existing actuator, such as a horn button, could be dedicated by the vehicle controller to provide a signal to the warehouse computer system 104 for activating another function, such as opening an overhead door, an entry to a freezer, or other devices. Here, it can be preferable to combine the function with a device that can correlate the location of the vehicle with the activated device. Thus, for example, the overhead door could be activated when the signal strength of the wireless devices indicate that the vehicle 10 is near the overhead door, and the actuator is turned on.

Various other functions can also be provided by the present invention. For example, when the warehouse computer system determines that a vehicle is out of service, or is likely to be out of service due to detected problems or a need for a recharge the vehicle, critical work can be reassigned to other vehicles in the fleet, thereby improving efficiency and limiting downtime.

The vehicle information system 100 can also determine which vehicles in a fleet are operating at better levels of efficiency than other vehicles based on operating parameters, driver skill, and material transportation dynamics, for example. Some types of material handling vehicles work better at horizontal transport, others at putting loads in a rack or taking them down. Some excel at order picking, both at high and low levels. In a given warehouse, the dynamic needs for moving materials may change hourly. The computing system can assign or reassign vehicles to certain tasks and improve throughput as conditions develop.

Another benefit of gathering the operational data from the plurality of material handling vehicles 10 operating in the warehouses 101 is that the data can be compiled in a number of different manners to present the warehouse management with useful reports, graphs and tables showing current vehicle usage and future needs. That compilation can be performed by a vehicle information reporting system implemented by software executed by the warehouse management computer system 114 or the warehouse computer system 104 depending upon where the warehouse management personnel are located. This enables the managers at a specific warehouse 101 to review the material handling vehicle operations at that facility and also enables the corporate executives at the company headquarters to analyze material handling vehicle operations for the entire company. In some embodiments, designated people can access the vehicle information system based on an assigned username and password, for example, and each designated person's access can be restricted to only certain sections of the system. For example, a manager at one warehouse may be limited to viewing data and reports for activity at only that specific warehouse, whereas an executive at the warehouse headquarters is able to access information for all the facilities of the warehouse company. In another example, a vehicle maintenance worker may be able to access vehicle performance information, but not information related to vehicle operators. The management of the company can set policies regarding the types of employees who may access certain kinds of information.

Figure 8:
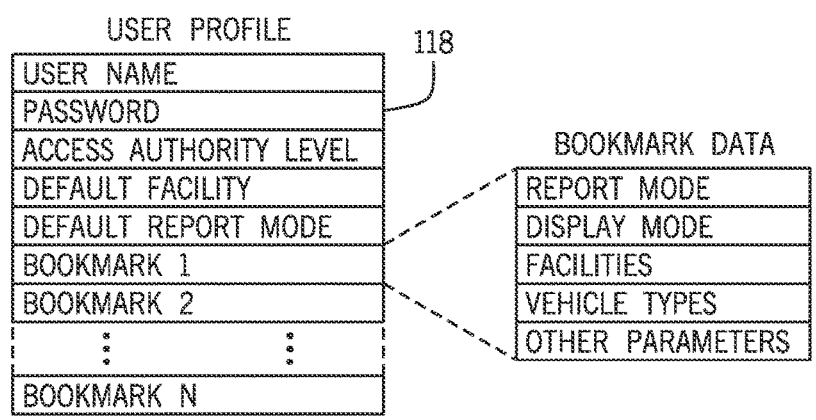
FIG. 8 graphically illustrates exemplary data of a user profile that can be stored in the warehouse computer system and accessed on an integrated display.

With reference to FIG. 8, the vehicle information reporting system can store a user profile 118 for each person who has authorized access. The user profile, in addition to defining the person's username, password and access authority level, also can contain configuration information that the associated user is able to set. The configuration information specifies certain preferences for that particular user, such as the format and kinds of data to be used in different types of report modes.

The vehicle information reporting system can process and display the gathered vehicle data in an interactive form with graphs and charts that show actual performance and predictive trends based on that performance. An unrestricted user is able to filter the data presentation so as to show data from all or selected ones of the company facilities, types of material handling vehicles, types of vehicle events, and operator performance. The user is able to navigate through the different display formats utilizing display tabs and check list type menus. In addition, an overview display mode can provide a concise understanding of the operating state of the material handling vehicles during a selected period of time, thereby enabling a synopsis comparison of vehicle operation among the different facilities and types of material handling vehicles. The system can provide trend information that can be used by management personnel to predict future material handling vehicle needs. For example, a trend chart may show that the time of use of the vehicle fleet is increasing to a point at which acquisition of additional vehicles is required.

It should be understood that the warehouse computer system 104, manufacturer computer system 112, and the dealer computer system 116 also are able to execute the information reporting system, however the particular types of data that these other computer systems may access can be limited by selectable configuration of the software. For example, operation at the warehouse computer system 104 may be limited by the company to accessing only information for the respective warehouse, and the manufacturer and the dealer computer systems are restricted from accessing proprietary data of the warehouse company and its employees.

In order to fully appreciate the full capability of the integrated display 55, the integrated display and its various modes of operation will be described in greater detail below.

Figure 9:
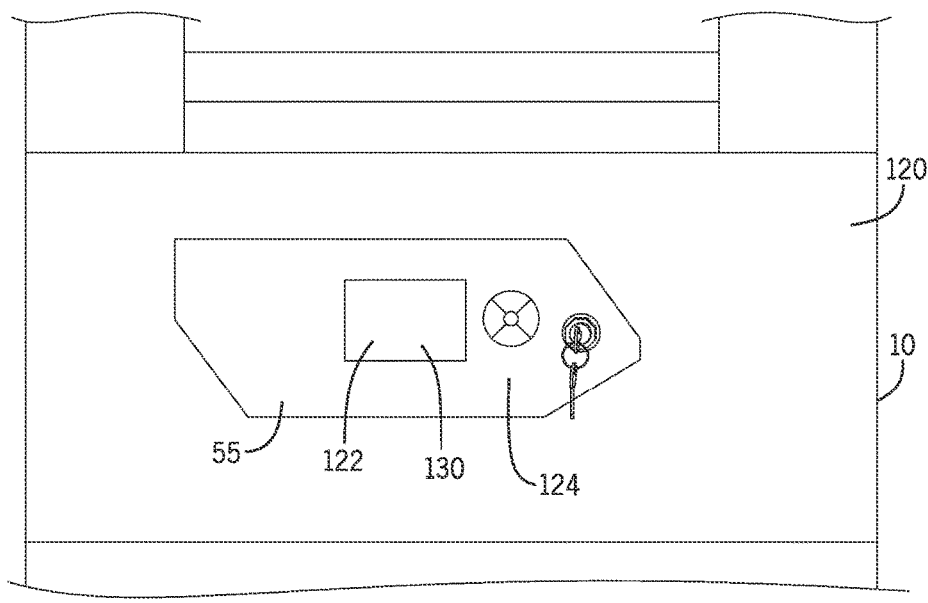
FIG. 9 is a plan view of an integrated display including a touch screen display panel and a five button manual input keypad, the integrated display providing accessibility to the warehouse computer system and the vehicle information reporting system from operational data gathered from the material handling vehicle.

Turning now to FIG. 9, an integrated display 55 according to embodiments of the invention is show. The embodiment shown in FIG. 9 illustrates that the integrated display 55 can be integrated with the body of the vehicle 10, such as in the dash 120 of the material handling vehicle 10, for efficient visual access and data input by the vehicle operator. The integrated display 55 is shown to include a touch screen component 122 and manual input keypad component 124. The integrated display 55 can receive power from the battery 37, or alternatively, the integrated display 55 can receive power from a different source.

Figure 10:
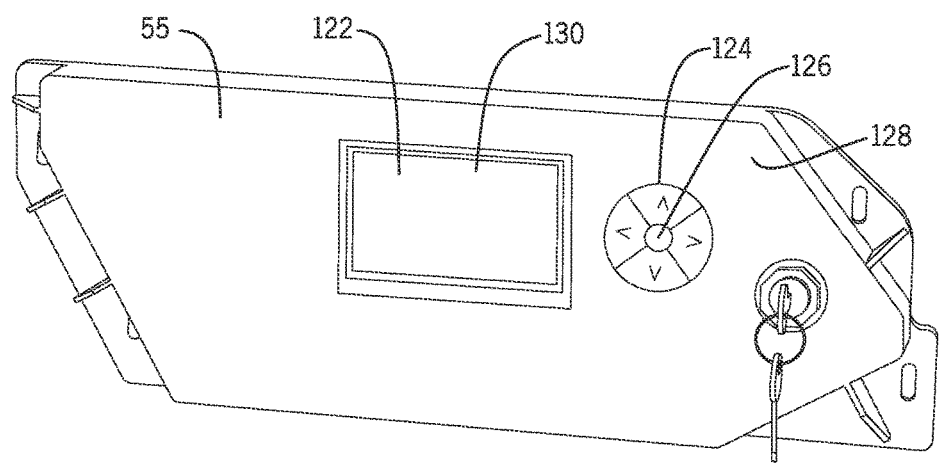
FIG. 10 is a perspective view of an embodiment of an integrated display that can be configured to be mounted in the vehicle housing.

Referring to FIG. 10, the touch screen 122 and manual input keypad 124 can be housed within a display housing 128. The display housing 128 can be sized and configured to be mounted within a predetermined opening in the dash 120. It is to be appreciated that the size and shape of the housing 128 and associated opening in the dash 120 can take on any shape to allow the integrated display to be mounted in the dash 120 or elsewhere on the vehicle 10. It is to be appreciated that more than one housing may be included. As a result, the integrated display 55 with the touch screen 122 and manual input keypad 124 are readily accessible for visibility, and data entry and data retrieval. The integrated display 55 allows an operator to be in control of the vehicle at all times.

When mounted in the dash 120 of the vehicle 10, the integrated display 55 reduces components near the front of the vehicle 10 and thus provides a more streamlined design. The integrated display 55 also provides a touch screen 122 that includes a graphical user interface 130 that can include controls that are simple to execute with the operator's finger or hand, and can be integrated with the manual input keypad 124 that can be near the touch screen 122. In some embodiments, the manual input keypad 124 can be a standard five way keypad, including up, down, left, and right buttons, and an Enter button 126. It is to be appreciated that other configurations are contemplated and would be understood by one skilled in the art.

Figure 11:
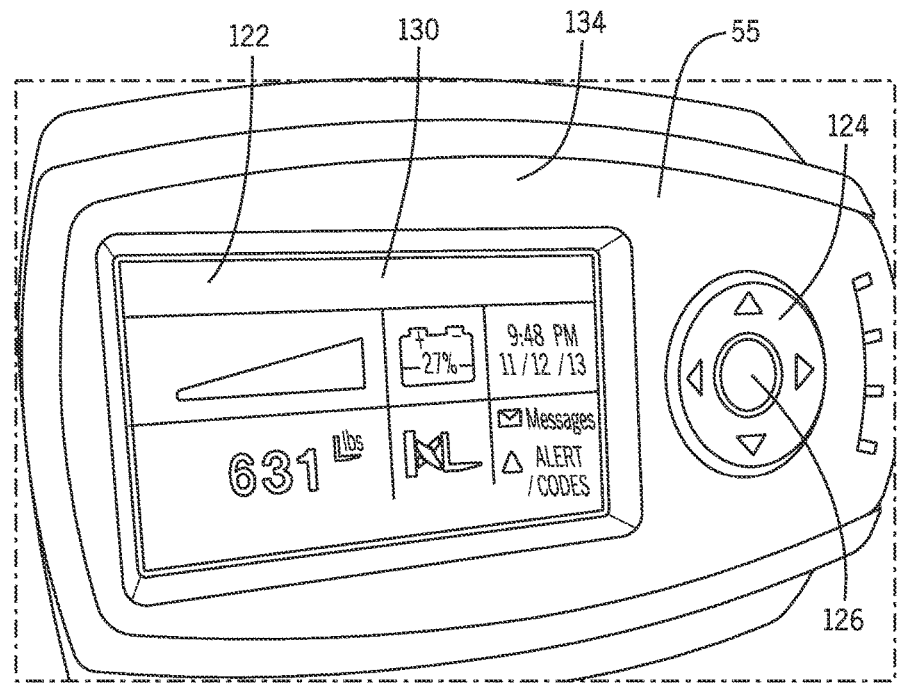
FIG. 11 is a perspective view of an embodiment of an integrated display that can be configured to be a stand-alone device, mountable to the vehicle with a mounting bracket.

Referring to FIG. 11, in other embodiments, the integrated display 55 can be a stand alone integrated display 134 that can be separately mounted to the vehicle 10 using a mounting bracket (not shown). The mounting bracket can provide flexibility for the mounting location, and allows the integrated display 134 to be articulated or pivoted to one side or the other of the lift truck 10 so an operator can view and control features on the integrated display unit 134 according to the operator's preference.

The integrated display 55 can be configured to display a variety information, including, but not limited to, information regarding data and functionality of the vehicle 10, warehouse management system applications, and fleet management information. As a few examples, information related to the data and functionality of the vehicle 10 can include speed of the vehicle, battery power, amount of time to maintenance, etc. Warehouse management system applications can include applications relating to displaying certain items of an order and the locations of those items. Fleet management information can include statistics on all vehicles 10 that form part of a fleet, such as the number and locations of all vehicles, the number of vehicles currently being used, number of hours each vehicle has been used in a specified time period, etc. Because the integrated display 55 can display information relating to the functionality of the vehicle 10, warehouse management system applications, and fleet management information all in one unit 55, this information may be accessed efficiently and more quickly than if such information was on multiple display units in various positions on the vehicle 10.

Additionally, the integrated display 55 can provide a navigation module interface in which sensory and situational awareness inputs, in addition to control inputs (e.g., throttle, braking, and turning), all pass through a common interface. The sensory and situational awareness inputs can include information obtained from equipment such as a location apparatus 136 that can allow the vehicle 10 to function as an AGV, or from other equipment configured on the vehicle 10 that provide feedback on a certain aspect of the vehicle or its environment. In some circumstances the integrated display 55 can be programmed to display certain inputs or messages that are based on the inputs received. Because the integrated display 55 can provide a common interface for sensory and situational awareness inputs as well as control inputs, the integrated display 55 can also be programmed to prioritize which, if any, outputs or messages are displayed on the graphical user interface 130. Other interface modules are contemplated, including a wireless communications module for Wi-Fi and/or cellular, for example; a USB module; and a universal card reader module, as non-limiting examples.

Figure 12:
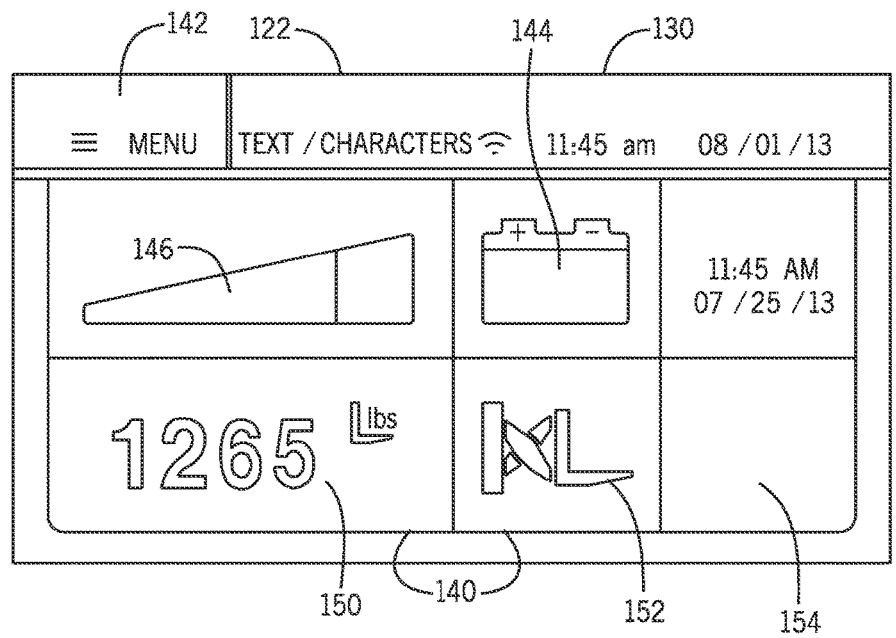
FIG. 12 is a view of an exemplary screen on the integrated display, the integrated display allowing customizable live tiles able to display live vehicle data.
Figure 13:
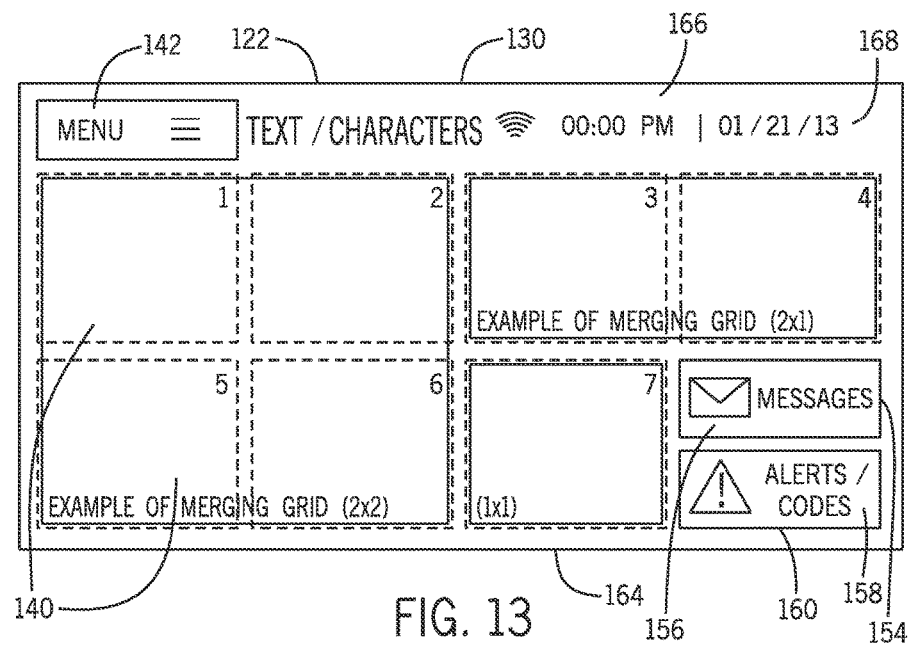
FIG. 13 is a view of a screen showing user customization options for the graphical user interface.

Referring to FIGS. 12 and 13, an exemplary "run screen" of the graphical user interface 130 on the touch screen 122 is illustrated in FIG. 12. The graphical user interface can provide an intuitive and simplistic interface incorporating a plurality of live tiles 140, where data is displayed on the tile in real time, as illustrated in FIG. 12. The graphical user interface 130 can provide a plurality of individual and nested drill down levels. In some embodiments, the graphical user interface 130 can be operator customizable to allow the operator, or fleet manager, for example, to customize each screen displayable on the graphical user interface 130.

As non-limiting examples, the "Menu" button 142 can open a nested screen. The Battery State of Charge (BSOC) button 144 can provide an indication of the current charge on the battery. The vehicle speed can be displayed using the speed indicator 146. The weight on forks tile 150 can display the current weight of the load being carried by the vehicle. In some embodiments, this tile can be a read only tile with no navigation point. Tile 152 can display the current status of the forks, either with some amount of extension or fully retracted, for example.

Referring to FIG. 13, the Message tile 154 can be a communication tool between the warehouse manager and each vehicle (individually or fleet wide). The message icon 156 can appear when a new message is received. Selecting the message icon screen, a Message List can display. Whenever there are active codes or alerts, an "Alerts/Codes" icon 158 can appear. Selecting the "Alerts/Codes" button 160, the Active Alerts/Warnings can display.

The live tiles 140 of the graphical user interface 130 can functionally be combined with telematics and the vehicle information system 100 programs. For example, specific zones, or tiles, of the graphical user interface can be reserved for display of live or stored data from various sources and applications. This can be preprogrammed, or can be user customizable, for example. In some embodiments, video input, such as analog video, can also be displayed in a defined tile.

Referring to FIG. 13, the assignment of location and size of tiles can be user configurable. In some embodiments, the graphical user interface 130 can be divided up into a grid pattern that can allow an operator to view icons and text in one live tile, two live tiles (vertical or horizontal), four live tiles (2× the size of the single tile icons), or eight live tiles, for example. It is to be appreciated that other sizes and patterns are contemplated, and can be based on the functionality and capabilities of the touch screen interface.

As can be seen, FIG. 13 shows various customizable screen layouts. The full screen 164 can be used as an individual active tile. The graphical user interface can also include a header 166 that can include a Menu button 142. The header 166 can also include a banner 168 that can identify characters, such as a company name, for example, and other information, such as date, time, and communication conditions, as non-limiting examples. The graphical user interface 130 can also be divided into two individual active tiles, plus the header 166. One or both of the two active tiles can be divided to produce four active tiles, plus the header 166. Further, each of the four active tiles can be divided to produce a graphical user interface having eight active tiles and the header 166. It is to be appreciated that the graphical user interface can be customized to include variations of the layouts shown in the figures.

Figure 14:
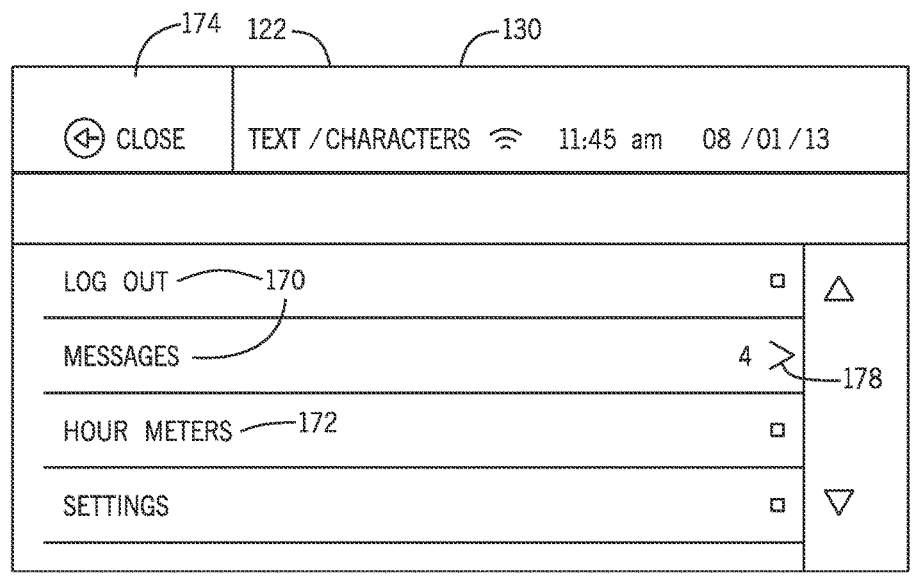
FIG. 14 is a view of a screen showing a screen after a menu button touch.
Figure 15:
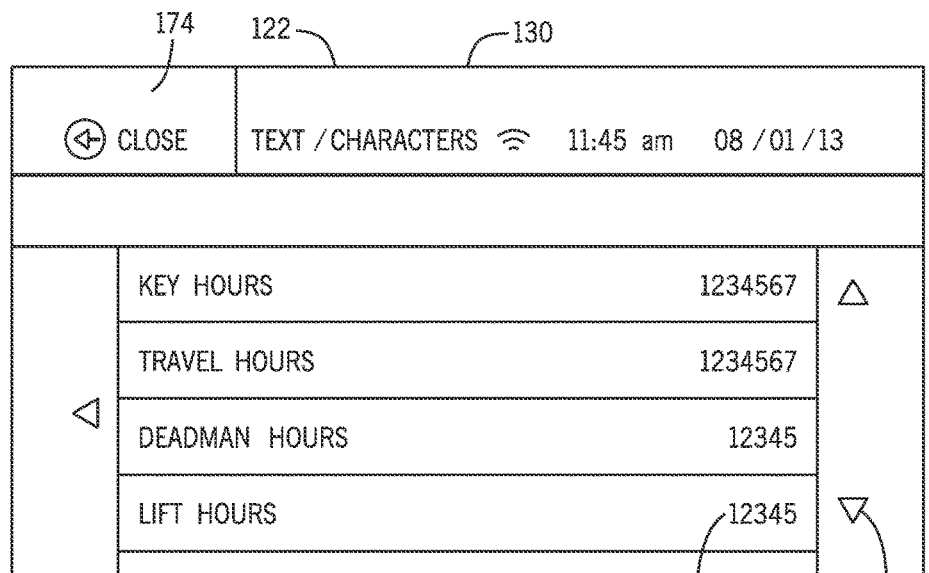
FIG. 15 is a view of a screen showing a further screen after a menu item of FIG. 14 has been touched.

By touching the Menu button 142, or by using the keypad 124 to highlight and select the Menu button, a sub-menu can be generated on the touch screen 122 that can include a listing of additional menu items 170, as shown in FIG. 14. Selecting any of the listed menu items 170 can bring up further details for the selected menu item. FIG. 15 shows further details after the "Hour Meters" button 172 was selected. The further details can include data, or can include data entry fields where the operator is able to enter data into the graphical user interface. Selecting the "Close" button 174 will exit the current screen and return the operator back to the screen from which they selected the Menu button 142. As non-limiting examples, when there is a ">" symbol 178 on the right edge of a menu item 170, it is letting the operator know there is an additional layer of navigation available. It is to be appreciated that any other symbol can be used. A "[Value]" 180 on the right edge of the navigation button (shown as 12345) lets the operator know there may be a setting input on the next screen. The "[Value]" displays the current set value, and in some embodiments, may not be editable.

Navigation Modes—Touch Mode and Keypad Mode

Figure 16:
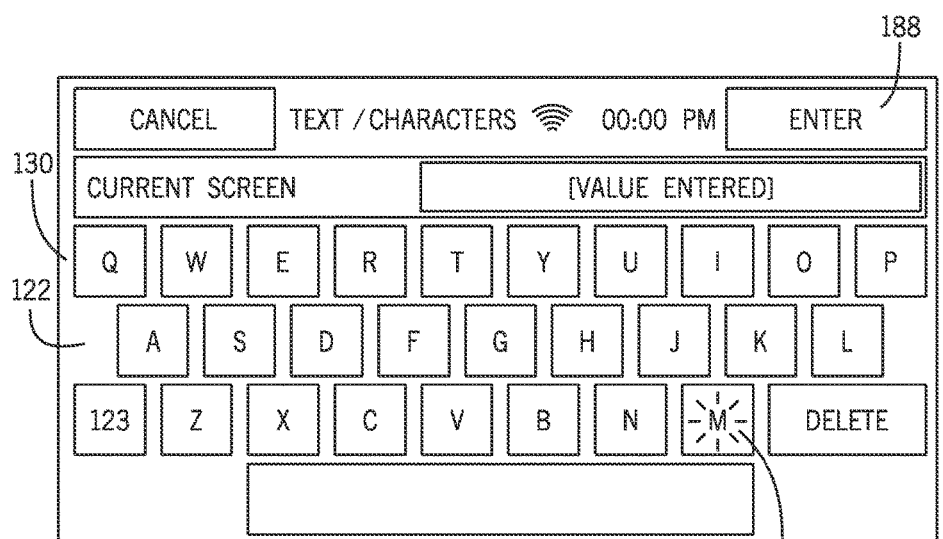
FIG. 16 is a view of a screen showing graphical user interface functionality, including a highlighted cursor state.

Referring to FIG. 16, the graphical user interface 130 can be fully touch screen capable. For some operations where the operator is wearing a glove or gloves, such as when the vehicle is operated in refrigerator or freezer environments, the touch screen 122 may be less convenient to interface with, and less preferred by the operator. In this case, the graphical user interface 130 can also be fully menu based utilizing the manual input keypad 124 instead of, or in combination with, the touch screen 122.

In some embodiments, the graphical user interface 130 can be biased toward touch screen use, but can automatically switch modes between a touch mode and a keypad mode based on how the graphical user interface is being used.

When the integrated display 55 is operated in the keypad mode, the graphical user interface 130 can include a highlighted cursor state 184. An operator can use the keypad 124 to move the highlighted cursor state 184 to a button, in this example the "M" button, and then can press the Enter button 126 on the keypad to "select" or "enter" the highlighted cursor button, depending on the button's function.

In some embodiments, when the touch screen 122 is touched, the graphical user interface 130 transitions to the touch mode, and the highlighted cursor state 184 is removed. While in the touch mode, the highlighted cursor state 184 can be removed to help avoid potential uncertainty as to the current mode of operation the integrated display 55 is in. If the operator then proceeds to press any of the arrow keys on the keypad 124, the highlighted cursor state 184 reappears, automatically transitioning the integrated display 55 back to the keypad mode. Touch mode can then be resumed when the Enter button 126 on the keypad 124 is selected, or when the touch screen 122 is again touched. While in the touch mode, only a single keypad entry may be needed to provide a one-time learn condition to transition to the keypad mode.

The integrated display 55 can also support a mixed input mode operation. In the mixed input mode, the integrated display 55 automatically senses input from either of the touch screen 122 and the keypad 124 and can accept the input according to the graphical user interface function currently active. As an example, while in the mixed mode, when an operator is entering a string of data using the touch screen keyboard 186 (FIG. 16), the keyboard input can be followed by pressing the Enter button 126 on the keypad 124, rather than pressing the Enter button 188 on the touch screen 122. As described above, while in the touch mode, the highlighted cursor state can be removed. Because in this example there would be no highlighted cursor state, the use of the Enter button 126 on the keypad 124 would indicate that the string of data is complete and entered, as compared to entry of the previous character touched on the touch screen 122.

While in the keypad mode, pressing the Enter button 126 following arrow button movement on the keypad 124 can be interpreted as a "SELECT" function. Pressing the Enter button 126 following a touch on the touch screen 122 enters, i.e., saves, the text string. So, when the operator uses the touch screen 122 to make a selection, and then presses the Enter button 126 on the keypad 124, the Enter button 126 acts as the "Save or Enter" button.

Figure 17:
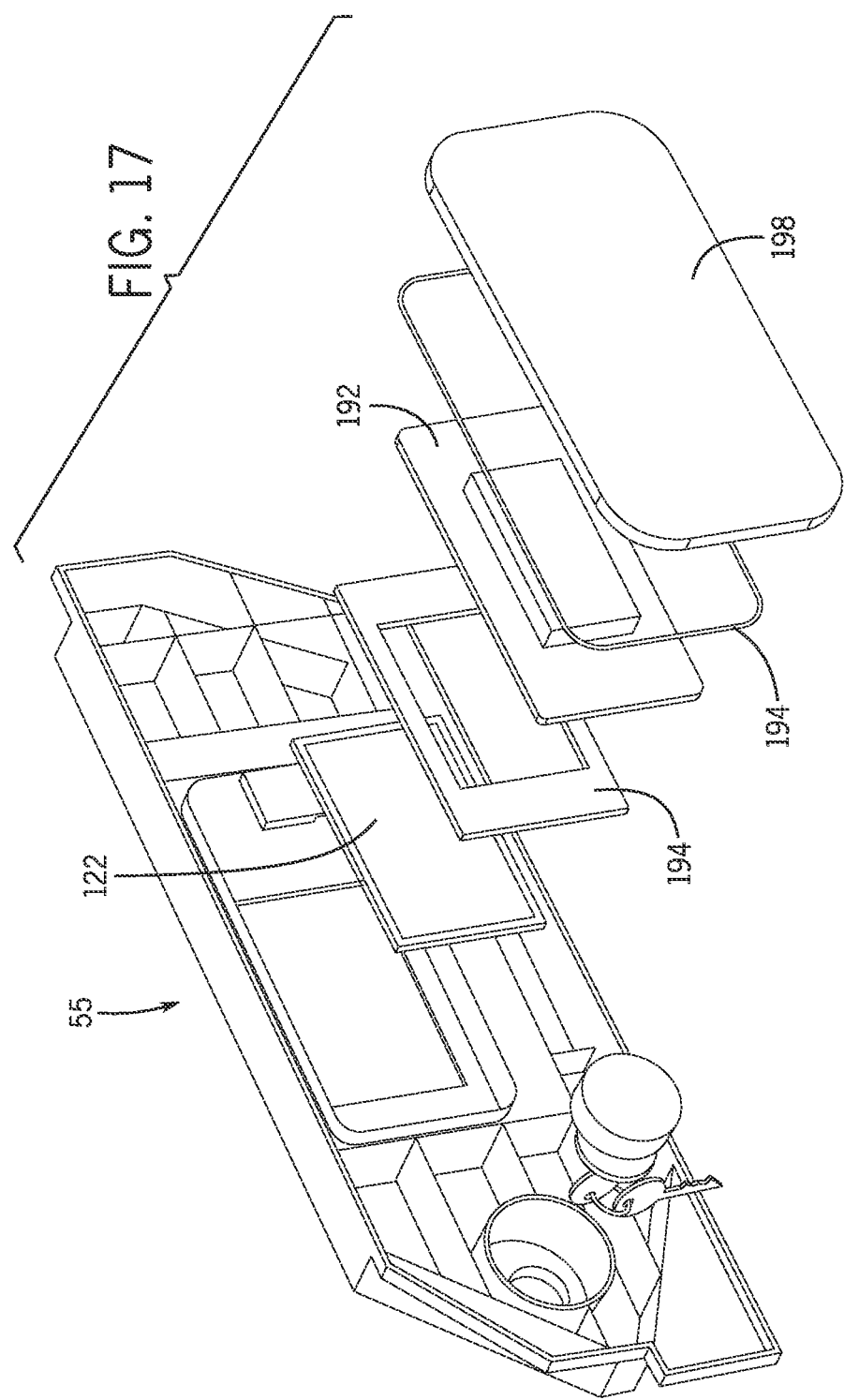
FIG. 17 shows a rear exploded view of the integrated display as shown in FIG. 9.

FIG. 17 shows a rear exploded view the integrated display 55 as shown in FIG. 9, including the touch screen 122, a circuit board 192, gaskets 194, and a cover 198, where the cover can also serve as a heat sink.

Figure 18:
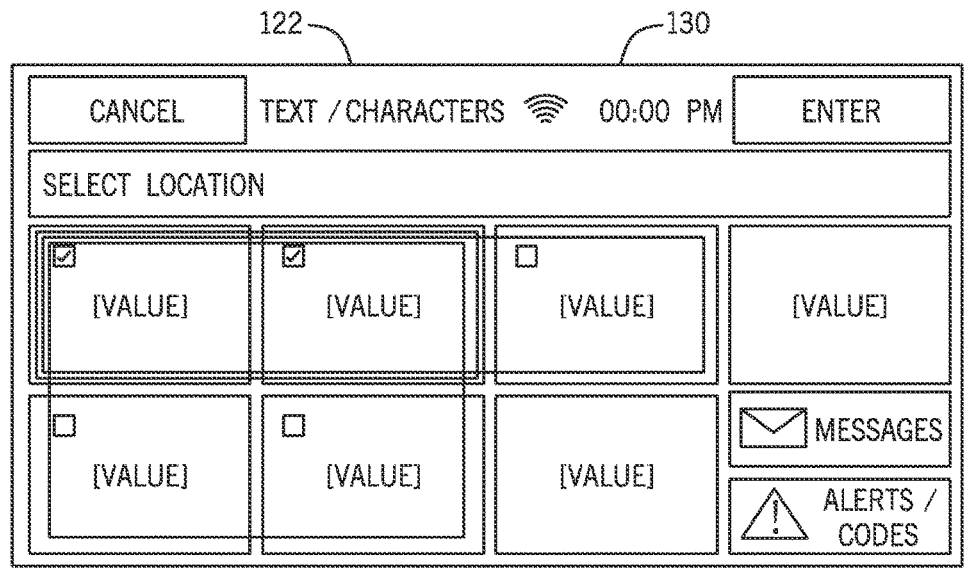
FIGS. 18-19 show additional views of screens in accordance with embodiments of the present invention.
Figure 19:
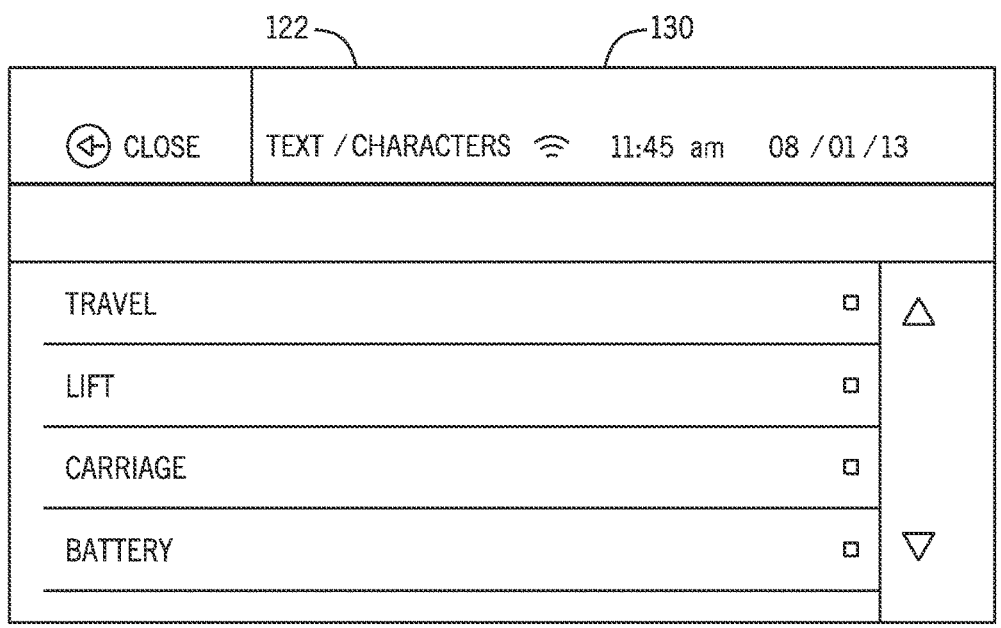

FIGS. 18-19 show additional views that can be available on the touch screen 122 in accordance with embodiments of the present invention. FIG. 18 shows user configuration of live tiles, and several live tile arrangements. FIG. 19 shows a screen that displays addition menu items after the down arrow 182 of FIG. 15 is touched.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. A material handling vehicle comprising:
a tractor unit;
a vertically movable platform mounted relative to the tractor unit, the platform being vertically movable between an upper position and a lower position;
an integrated display system, the integrated display system including a display screen, the display screen to simultaneously display a plurality of live tiles;
a manual input keypad, with both the display screen and the manual input keypad operable to control the integrated display system;
wherein the display screen is operable by a user's touch; and
wherein the integrated display system is operable in a mixed input mode, where in the mixed mode, the integrated display system automatically accepts input from the display screen immediately after input from the manual input keypad, and the integrated display system automatically accepts input from the manual input keypad immediately after input from the display screen, and an appearance of a highlighted cursor state on the display screen depends on toggling between input from the manual input keypad and input from the display screen.

2. The material handling vehicle according to claim 1, wherein the plurality of live tiles displays live material handling vehicle data.

3. The material handling vehicle according to claim 2, wherein the plurality of live tiles can be touched, and the display screen will display a menu associated with the plurality of live tiles and the live material handling vehicle data.

4. The material handling vehicle according to claim 1, wherein the touch display screen displays at least one of telematics information, warehouse management information, and vehicle information on one screen.

5. The material handling vehicle according to claim 1, wherein one of the plurality of live tiles displays a live battery status.

6. The material handling vehicle according to claim 5, wherein when one of the plurality of live tiles is touched, the display screen will display a battery menu.

7. The material handling vehicle according to claim 1, wherein the plurality of live tiles are user configurable.

8. The material handling vehicle according to claim 1, wherein the display screen is customizable to simultaneously display more than one live tile.

9. An integrated display system, the system comprising:
a display screen, the display screen to simultaneously display telematics information and vehicle information on one screen, the one screen comprising a grid of live tiles;
wherein the integrated display displays a graphical user interface, the integrated display including a touch display screen, and a manual input keypad, with both the touch display screen and the manual input keypad operable to control the graphical user interface;
wherein the integrated display system is operable in a mixed input mode, where in the mixed mode, the integrated display system automatically accepts input from the touch display screen immediately after input from the manual input keypad, and the integrated display system automatically accepts input from the manual input keypad immediately after input from the touch display screen, and an appearance of a highlighted cursor state on the touch display screen depends on toggling between input from the manual input keypad and input from the touch display screen.

10. The system according to claim 9, wherein the integrated display system is operably coupled to a material handling vehicle, the material handling vehicle including a tractor unit; and
a vertically movable platform mounted relative to the tractor unit, the platform being vertically movable between an upper position and a lower position.

11. The system according to claim 10, wherein a material handling vehicle operator to interact with the material handling vehicle uses the touch display screen only, the manual input keypad only, or a combination of both the touch display screen and the manual input keypad.

12. The system according to claim 9, wherein the manual input keypad is a five way menu configuration with up, down, left, right and Enter functionality.

13. The system according to claim 12, wherein the Enter functionality following a touch of the touch display screen enters a text string.

14. The system according to claim 12, wherein the Enter functionality following a touch of an arrow key on the touch display screen enters a character.

15. The integrated display system of claim 9, wherein the display screen simultaneously displays telematics information, warehouse management information, and vehicle information on one screen.

16. A material handling vehicle comprising:
a tractor unit;
a vertically movable platform mounted relative to the tractor unit, the platform being vertically movable between an upper position and a lower position;
an integrated display system, the integrated display system including a touch display screen, the touch display screen to simultaneously display a plurality of live tiles, the plurality of live tiles to display live material handling vehicle data;
the touch display screen further displays at least one of telematics information and vehicle information on the touch display screen;
a manual input keypad, with both the touch display screen and the manual input keypad operable to control the integrated display system;
wherein a material handling vehicle operator to interact with the material handling vehicle uses the touch display screen only, the manual input keypad only, or a combination of both the touch display screen and the manual input keypad; and
wherein an appearance of a highlighted cursor state on the touch display screen depends on toggling between input from the manual input keypad and input from the touch display screen.

17. The material handling vehicle according to claim 16, wherein the integrated display system displays a graphical user interface, with both the touch display screen and the manual input keypad operable to control the graphical user interface.

18. The material handling vehicle according to claim 16, wherein the integrated display system is operable in a mixed input mode, where in the mixed mode, the integrated display system automatically accepts input from the touch display screen immediately after input from the manual input keypad, and the integrated display system automatically accepts input from the manual input keypad immediately after input from the touch display screen.

19. The material handling vehicle of claim 16, wherein the touch display screen further displays warehouse management information on the touch display screen.

* * * * *